United States Patent [19]

Ichikawa

[11] Patent Number: 4,843,560
[45] Date of Patent: Jun. 27, 1989

[54] COST COUNTER WITH A COST METER CAPABLE OF READING STORED DATA

[75] Inventor: Kiyomichi Ichikawa, Tokyo, Japan

[73] Assignee: Autostamp Institution Limited, Tokyo, Japan

[21] Appl. No.: 919,876

[22] Filed: Oct. 16, 1986

[51] Int. Cl.⁴ .................... G06F 15/20; G06F 3/00
[52] U.S. Cl. .................. 364/464.02; 364/405; 364/707; 235/60 AP
[58] Field of Search ............... 364/464, 466, 707, 709, 364/710, 405, 406, 412, 200, 900; 235/31 R, 31 T, 32, 34, 19, 20, 432, 433, 439, 60 AP, 60.4, 60.51, 60.52, 103

[56] References Cited

U.S. PATENT DOCUMENTS

| | | | |
|---|---|---|---|
| 4,573,141 | 2/1986 | Simon | 364/464 |
| 4,584,647 | 4/1986 | Eckert | 364/464 |
| 4,623,987 | 11/1986 | Soderberg et al. | 364/464 |
| 4,636,959 | 1/1987 | Salazar et al. | 364/464 |
| 4,710,883 | 12/1987 | Wilson et al. | 364/464 |
| 4,713,769 | 12/1987 | Hills et al. | 364/464 |

FOREIGN PATENT DOCUMENTS 58-117089 of 0000 Japan .
60-211569 of 0000 Japan .

Primary Examiner—Parshotam S. Lall
Assistant Examiner—Brian M. Mattson
Attorney, Agent, or Firm—Helfgott & Karas

[57] ABSTRACT

Cost counting apparatus wherein at each transaction a printing drum prints a consumed amount that is pre-set into the apparatus, a calculating section subtracts that amount from a balance that is initially set into an electronic memory, an electromechanical display section displays the resulting balance after each transaction and the positions of the elements of the display are communicated for use in restoring the balance information to memory in the event of power failure.

1 Claim, 4 Drawing Sheets

COST COUNTER WITH A COST METER CAPABLE OF READING STORED DATA

FIELD OF THE INVENTION

This invention relates to a cost counter, such as a postage counter, a revenue-tax counter and the like, more particularly to a cost counter with a cost meter capable of reading stored data in which the data of a balance amount of money may be restored and confirmed even when such data is lost from an electronic memory of a main storing means during calculation and display of the balance amount.

BACKGROUND OF THE INVENTION

Conventional cost counters of such type are comprised essentially of purely mechanical displaying and calculating sections for subtracting a consumed amount of money from a given preset amount. There are also cost counters of purely electronic construction having the same means as conventional electronic registers. Such electronic type counters can transmit data on one hand, but have disadvantages on the other hand.

In general, a cost counter user pays a certain amount of money to a collector who sets the amount into a balance meter. The cost counter calculates a balance amount at each use and may continue operation as long as the balance amount is surplus. For this reason, the balance data should not be varied or lost or permitted to disappear even when the counter is not used for a long period of time, or the power source is shutdown. With a purely electronic counter, for example, the balance data after occurrence of a power failure should be confirmed even if an electronic circuit appears not to be disturbed. In a conventional electronic cost counter, however, such the loss of balance problem due to power failure is difficult to solve.

For example, a counter utilizing a RAM (Random Access Memory) as a memory means cannot be protected from the power shutdown. In order to solve this problem, a postage meter as shown in Japanese Patent Publication 58-117089 utilizes a non-evaporative memory as a memory means for the balance data, while some counters employ a magnetic memory means. Even these means cannot completely protect the data from being lost, because an accident in a reading means for inner data or in a displaying means may disturb the data and prevent its confirmation.

With the purely mechanical counter on the other hand, the problem of retaining the data upon the event of the type of accident encountered in the electronic types of construction may be avoided. A balance-displaying section of a mechanical calculating mechanism is extremely complicated, requiring an extremely difficult developing and manufacturing effort. Further, in the mechanical type it is nearly impossible to transmit the inner data to an external instrument and hence it is usually unsuitable for use in a data-maintenance art which utilizes an external data-retaining system.

Accordingly, an object of the invention is to provide a cost counter with a cost meter capable of reading stored data, which has the ability of retaining data of a balance amount by means of a simple mechanism utilizing an electronic calculating circuit.

Another object of the invention is to provide a cost counter capable of recovering and confirming the stored balance data which has hitherto been lost in the conventional electronic system in case of non-use for a long time or an accidental power shutdown and of transmitting the data to an external instrument for ensuring the data maintenance which has not been achieved by the conventional mechanical systems.

A further object of the invention is to simplify the mechanism by using a microprocessor for calculation with various controls and by using an electronic memory as a main memory means.

A still further object of the invention is to enable data equivalent to the stored balance data to be displayed on a mechanical balance-displaying meter for confirming the data upon an accident.

A further object of the invention is to provide a cost counter having a function of reading the displayed data from the mechanical balance-displaying meter into a memory and recovering the data therein upon disappearance of the data from the memory.

SUMMARY OF THE INVENTION

In order to achieve the above objects, the invention provides a cost counter with a cost meter capable of reading stored data, comprising a printing drum having a mechanism for printing a consumed set amount of money, a driving mechanism for controlling the printing drum and a costing mechanism for subtracting the consumed amount from a preset balance and for displaying a resulting balance after the subtraction, characterized in that the costing mechanism comprises a consumed amount setting section for setting the consumed amount and outputting the latter as an electric signal, a calculating section for sequentially subtracting the consumed amount from the balance data which has been electrically preset in a balance-receiving section and a balance-displaying meter section, and in that the calculating section controls the balance-displaying meter section for providing a display corresponding to balance data when the latter is stored in a memory section, while the calculating section detects a position of a number ring upon its each rotation by means of a detecting mechanism for reading balance data before lost when the latter has been lost from the memory section, thereby to enable the balance data to be restored in the memory section.

In the cost counter according to the invention, an initial amount or balance amount of money is inputted by operation of a balance-receiving section. Then the amount is stored into a memory of a calculating section, while a number ring in a balance-displaying meter is intermittently rotated for visualizing the number, thereby to display the balance amount.

Thereafter, a user allows a setting section for a consumed amount to slide forward and to engage therewith an amount-printing mechanism of a printing drum. The setting section for the consumed amount is then operated to set the consumed amount thereinto and into the amount-printing mechanism. There-after, the setting section is retreated to disengage the printing mechanism.

Then a paper is inserted, which is detected by a detecting mechanism for enabling the calculating section to read the consumed set amount from the balance-displaying meter and to actuate a driving mechanism for providing a single rotation of the printing drum only when the consumed amount is not in excess of the balance amount in the memory.

When the printing drum is rotated, the printing mechanism may print the number on the inserted paper which is then removed therefrom. After this printing operation with rotation of the printing drum, its end signal enables the calculating section to subtract the consumed amount from the balance data in the memory and to display a calculated balance on the balance-displaying meter after the subtraction.

The display of the balance amount on the meter may be visually accomplished by rotating the number ring intermittently and holding the number at a predetermined position.

When the balance data is lost from the memory by the power shutdown, for example, a RAM of the memory section is checked upon recovery of the power supply for inspecting a fixed storing pattern or a checking data of the balance amount, thereby to detect the disappeared data. During this inspecting period, the calculating section does not work normally but allows the number ring to perform a single rotation in the balance-displaying meter for reading and analyzing the displayed data by means of a detecting mechanism. The read-out data is then transmitted to and restored in the memory. Thereafter, the normal operation may be resumed.

In other words, when the number ring has displayed a specific number in the balance-displaying meter, the ring may be rotated intermittently by the single rotation for displaying the same number again. If the number ring is rotated intermittently by a number corresponding to the single rotation minus the specific number, an output signal is generated by the position-detecting means so that the subsequent counting procedure for the intermittent number of rotations may present the specific number. Thus, by reformation of the read-out data on the memory, the lost data may be recovered. Especially, this recovery of the balance amount may be accomplished in each figure of the number.

The invention will now be described herein-below for better understanding with reference to the accompanying drawings.

PREFERRED EMBODIMENTS OF THE INVENTION

Figure 1:
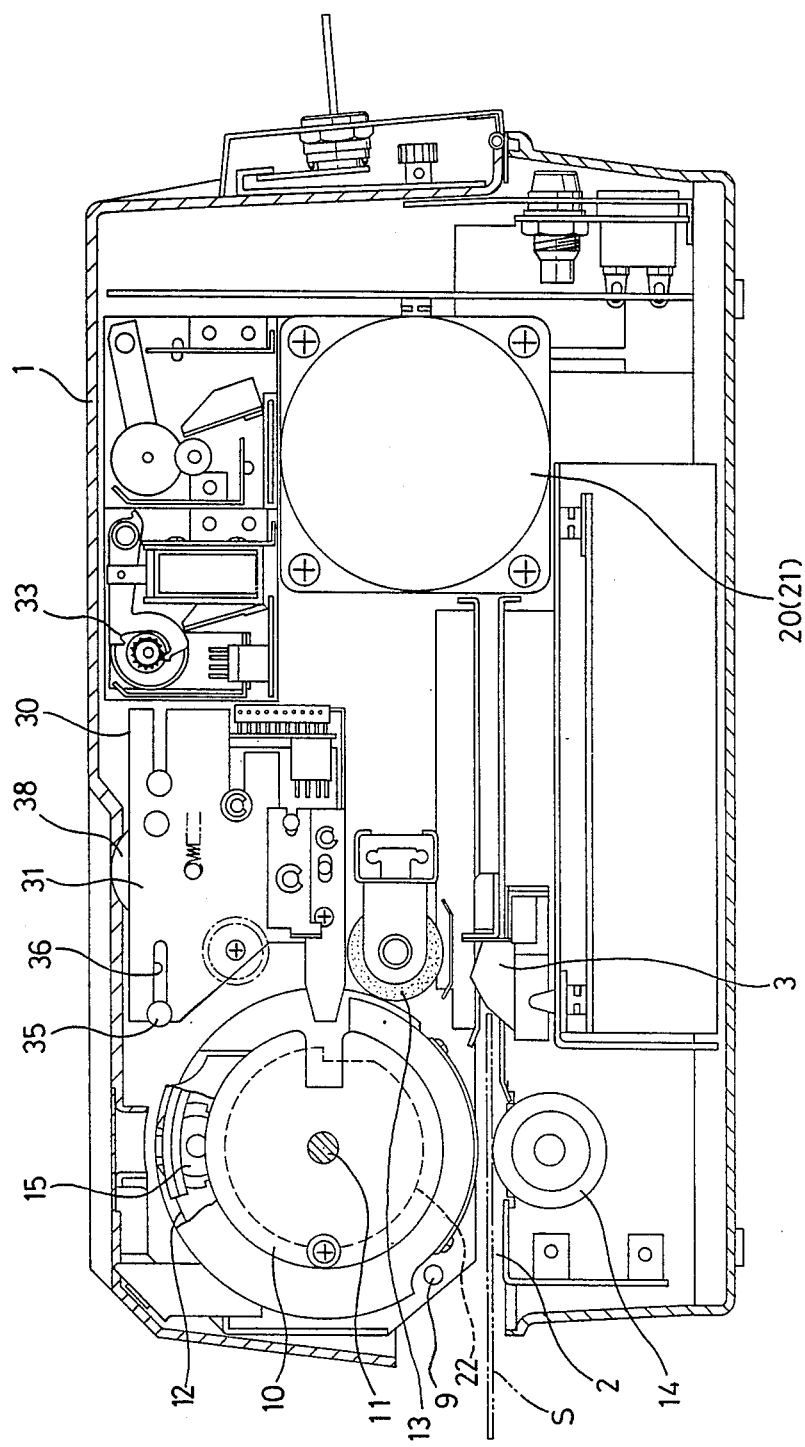
FIG. 1 is a schematic sectional view of the cost counter according to the invention.

In the drawings, reference 1 represents a frame provided at its front with an opening 2 for a printing treatment, into which is inserted a paper S to be printed with a cost or fee, such as a postage paper or a revenue-tax paper. After printing, the paper is removed therefrom.

In order to print the paper S, the frame 1 contains therein a printing drum 10 having a mechanism 15 for printing a consumed amount of money, a driving mechanism 20 for controlling the printing drum 10 and a costing mechanism 30 for subtracting the consumed amount from a preset balance amount and for displaying a resulting balance after the subtraction.

The driving mechanism 20 has a motor 21 to be driven by a starting signal which is generated upon detection of the inserted paper S by a paper-sensor 3 arranged at the opening 2. A driving force of the motor 21 enables the printing drum 10 to perform a single rotation through a transmitting means (not shown) and a single-rotation clutch 22.

The printing drum 10 is supported at its drum shaft 11 to the frame 1 and at its circumference provided with a cost-printing mechanism 15 for printing a consumed amount of money which is set by a printing plate 12, and a costing mechanism 30. When the printing drum 10 performs the single rotation, it may be applied with an ink from an ink applying mechanism 13 arranged circumferentially outside the printing drum 10. Then, the applied ink may be transferred onto the paper S by an elastic pressure against a platen 14 arranged under the opening 2.

After the single rotation of the printing drum 10, an output signal from a drum-rotation sensor 9 enables the costing mechanism 30 to perform a calculation of subtracting the consumed amount from balance data.

The rotation of the printing drum 10 with the rotational force of the driving mechanism 20 as well as the printing on the paper S with the printing plate 12 and the printing mechanism 15 may be accomplished by means of known transmitting mechanisms and conventional clutches which may be omitted for their detailed description for simplification.

Figure 2:
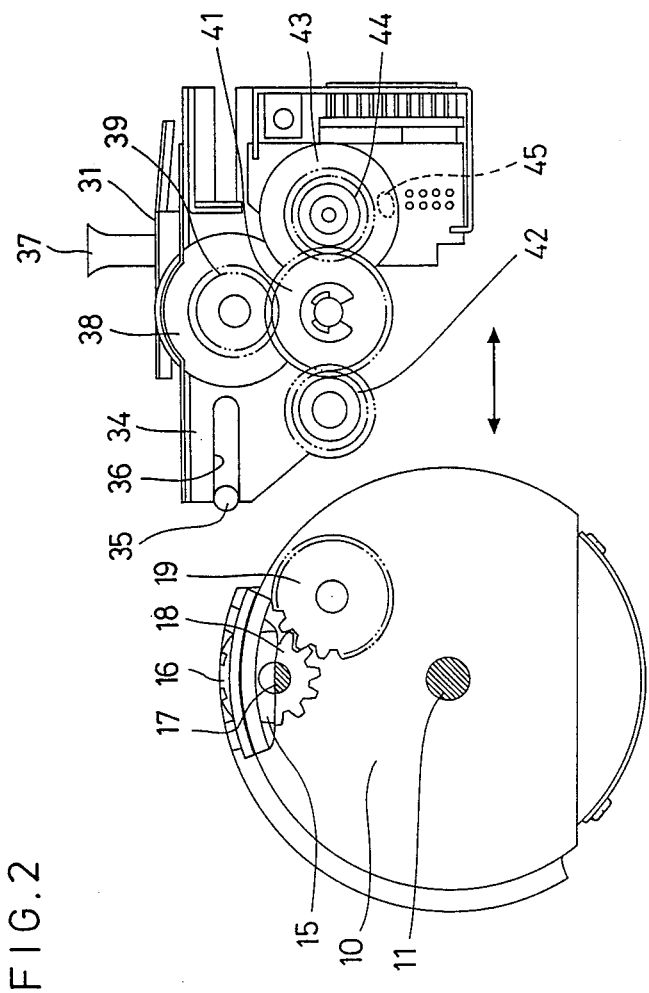
FIG. 2 is a sectional view of a main portion of a setting section for a consumed amount and a balance-displaying meter associated therewith.

The printing mechanism 15 arranged on the printing drum 10 carries a plurality of number rings 16 corresponding to the number of figures and exposed on a circumference of the printing drum 10, as shown in FIG. 2, and is supported to a printer shaft 17 between side plates of the printing drum 10. Each of the number rings 16 is meshed with an intermediate gear 19 which in turn is supported between the side plates of the printing drum 10 by a gear 18 integrated with a side of the number ring 16. The intermediate gear 19 is releasably meshed with a setting section 31 for the consumed amount in the costing mechanism 30, as described hereinafter.

The costing mechanism 30 comprises a consumed amount setting section 31 for setting the consumed amount and outputting the latter as an electric signal, a calculating section 32 for sequentially subtracting the consumed amount from the balance data which has been electrically preset in a balance-receiving section 71, and a balance-displaying meter section 33 for visualizing the balance by a displaying 49 of the number ring 51 after the calculation.

The consumed amount setting section 31 is slidably supported to the frame 1 and contactable with the printing mechanism 15. When the setting section 31 is moved toward the printing mechanism 15 on the printing drum 10, an amount of money is set onto the printing mechanism 15. When retreated from the printing mechanism 15, on the other hand, the setting section 31 is disengaged therefrom. For this purpose, as shown in FIG. 2, a sliding frame 34 is provided with a guide groove 36 which is slidably engaged with a guide rod 35 protruded from an inner surface of the frame 1 and is arranged in a contactable direction to the printing mechanism 15. Further, the frame 1 at its upper side is provided upwardly with a sliding knob 37. On the sliding frame 34 are supported a plurality of amount-setting dials 38 which are exposed from the frame 1 for performing and visualizing their operation. Each setting dial 38 is meshed with an intermediate gear 41 in the sliding frame 34 through a dial gear 39 integrated with a side of the setting dial 38. The intermediate gear 41 may be meshed with a transmission gear 42 supported on the sliding frame 34 on the printing drum side when the sliding frame 34 is moved toward the intermediate gear 19.

On the other hand, the intermediate gear 41 is meshed with a signal plate gear 44 integrated with a signal plate 43 which is supported on the sliding frame 34. The signal plate 43, which is rotatable with rotation of the intermediate gear 41, enables a cost sensor 45 on one side of the signal plate 43 to read the position-detecting section which is arranged on a required side position of the signal plate 43 in order to detect a rotational position of the signal plate 43 itself. This position-detecting procedure may be accomplished not only by a photometric means, such as a photo-sensor for detecting the position-detecting section in the form of an aperture in the signal plate 43, but also by other means, such as a magnetic sensor.

The setting dial 38 of the setting section 31 and the number ring 16 of the printing mechanism 15 are corresponded, respectively. Namely, when the setting section 31 is operatively associated with the printing mechanism 15, the rotating operation of the setting dial 38 may set the number ring 16 through each gear so as to print a desired number. Simultaneously, the rotation of the signal plate 43 enables the sensor 45 to detect the rotational position for reading a code corresponding to the amount of money which is outputted into the calculating section for its subtraction from the balance data.

When the setting section 31 is disengaged from the printing mechanism 15, on the other hand, the number ring 16 and the setting dial 38 are prevented from their rotation in order to protect injustice and robbery. Such protective mechanism may be omitted for its detailed description because of its conventional construction.

Figure 3:
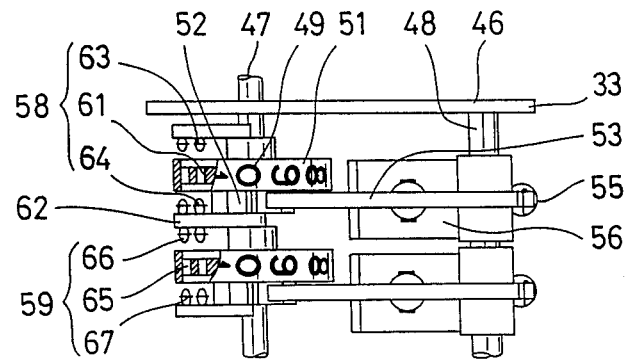
FIG. 3 is a plane view of a portion of the balance-displaying meter.
Figure 4:
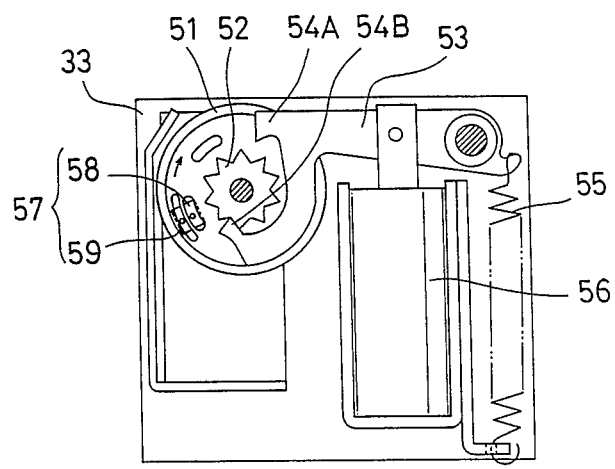
FIG. 4 is a side view of the balance-displaying meter.

The balance-displaying meter 33 is arranged at the frame 1 so as to visualize the balance amount externally. As shown in FIGS. 3 and 4, the balance-displaying meter 33 comprises a plurality of unitary figures of identical construction, which are arranged in parallel in order to satisfactorily show the amount of money. Such mechanism will be illustrated herein-below.

A number ring shaft 47 and an arm shaft 48 are supported to a frame 46 incorporated in the frame 1. The number ring shaft 47 is provided on its circumference rotatably with a number ring 51 having ten numbers (0 to ten) on a number display 49 which is visual externally. The number ring 51 may be intermittently moved by an intermittent moving means which is operated by controlling the calculating section 32 and the detecting mechanism 57.

For this purpose, the intermittent moving means is provided at a side of the number ring 51 with a star wheel 52 which is a star-shaped gear having the same number of teeth as the number on the display 49 (in this embodiment, divided in ten parts). Further, the arm shaft 48 is swingably provided with a meter lever 53 for engaging the star wheel 52 and intermittently rotating the number ring 51. The meter lever 53 forms an intermittent moving section having a C-shaped front end, upper and lower nails 54A and 54B of which are alternately engaged with the star wheel 52 for its rotation at a half pitch. The meter lever 53 at its rear end is associated with a spring 55 for normally urging the lower nail 54B against the star wheel 52. Within the frame 46 is fixed a meter solenoid 56 having a plunger which is connected to a middle portion of the meter lever 53. When the meter solenoid 56 is energized by a controlling signal from the calculating section 32 and the detecting mechanism 57, the meter lever 53 may be pulled against a force of the spring 55.

When an electric current flows through the meter solenoid 56 for its energization, the plunger is attracted to the solenoid 56, thereby to swing the front end of the meter lever 53 downwardly. Thus, the upper nail 54A is engaged with the star wheel 52 for its rotation at a half pitch in a direction as shown by an arrow in the drawing. When the solenoid 56 is disenergized, the meter lever 53 is swung by the elastic force of the spring 55 to allow the lower nail 54B to engage the star wheel 52 for its rotation at a half-pitch in the same direction. Thus, the single ON-OFF operation of the solenoid 56 enables the number ring 51 to rotate intermittently through the star wheel 52, which represents a single movement for achieving a single variation of the display 49.

Further, there is arranged a detecting mechanism 57 for detecting a position of the number display 49 on the number ring 51. The detecting mechanism 57 comprises a rotation-detecting means 58 for detecting a rotating position during one rotation of the number ring 51, and a position-detecting means 59 for detecting an absolute position of the number ring 51.

The rotation-detecting means 58 is formed by arranging a half number of radial rotation-detecting apertures 61 relative to the number of the display 49 (for example, five apparatus), which apertures 61 are arranged radially spaced apart at an equal angle of 75. At one of intermediate base plates 62 or frame walls 46, which stand on either side of each number ring 51, is arranged a rotation-detecting photo-diode 63 while at the other one is arranged a rotation-detecting sensor 64 in such a way that a light-beam generated from the photo-diode 63 may be detected by the detecting sensor 64 through the apertures 61. Assuming that an output of the detecting sensor 64 is 1 (one) when the sensor 64 receives the light-beam, another output of the sensor 64 is 0 (zero) when the latter does not detect the light-beam due to swing movement of the meter lever 53 and hence rotation of the number ring 51 by one pitch. Thus, the output signal may be reversed at each intermittent rotation of the number ring 51, thereby to enable the reversible detection of the output signal to confirm the accurate rotation of the number ring 51.

The position-detecting means 59, on the other hand, is formed by arranging two apertures 65, one of which is located at an outer edge of each number ring 51 outwardly from the detecting aperture 61, while the other one is in the opposite direction. Further, at one of the intermediate base plates 62 or the frame walls 46 is arranged a position-detecting photo-diode 66 while at the other one is arranged a position-detecting sensor 67 in such a way that a light-beam from the photo-diode 66 may be detected by the detecting sensor 67 through the aperture 65. Thus, similarly to the rotation-detecting means 58, the judgement of an output from the sensor 67 may confirm the absolute position of the number ring 51. Even if the position is located at a site which cannot be detected by the output signal from the position-detecting means 59, the rotation phase may be judged by counting the rotation signals with the rotation-detecting means 58.

Although the operation of the detecting means has been described herein-above for a single figure with the rotation and position-detecting means 58 and 59, a plurality of figures may be similarly treated by arranging a plurality of units of the same principle.

Figure 5:
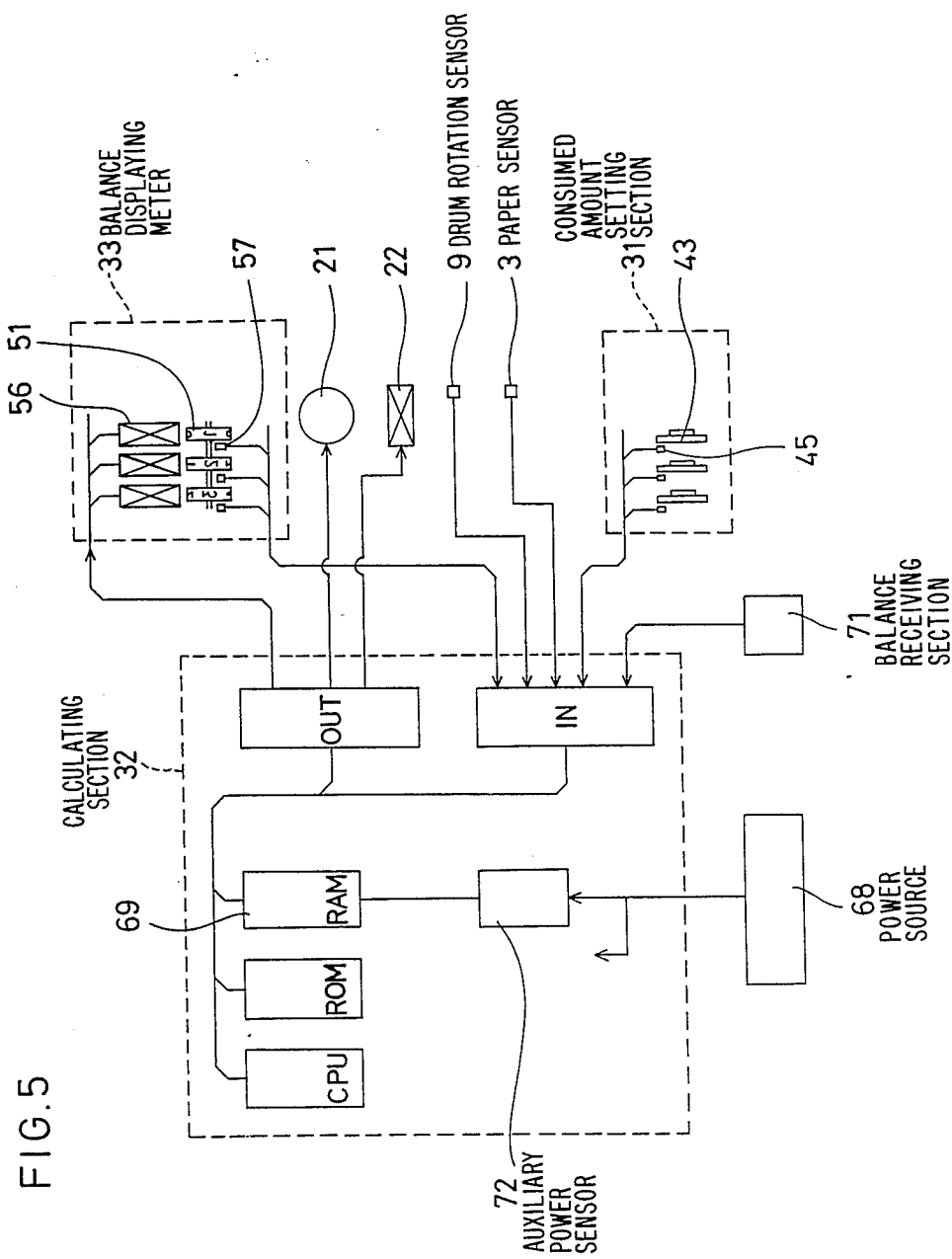
FIG. 5 is a diagram of a controlling circuit.

Now, the controlling circuit for the calculating section 32 will be described with reference to FIG. 5. The circuit comprises a power source 68, a memory section 69 for receiving an electric current from the power source 68 and storing the balance amount calculated by subtracting the consumed amount from the preset balance amount, a microprocessor, as well as an input- and output-interface circuit. The storage of the balance amount is carried out by the memory section 69 of a RAM, wherein the amount introduced into a balance-receiving section 71 is stored into the memory section 69 while the subtraction of the consumed amount is treated electronically. The balance-receiving section 71 is a number-input device, such as a digital switch, into which a necessary balance amount has been previously set prior to use of the cost counter according to the invention, while the data is displayed on the number ring 51 by operation of the meter solenoid 56 and the meter lever 53 in the balance-displaying section 33 through the memory 69.

Further, the calculating section 32 is provided with an auxiliary power source 72 composed of a large capacity condenser which may be charged by the main power source 68. The auxiliary power source 72 may supply a current to the memory section 69 for retaining the data for a certain period of time (for example, several weeks) even if the current is not available from the main power source 68.

In accordance with the invention thus constructed, the balance-receiving section 71 is inputted at first with an initial balance amount. Then, the amount is stored into the memory section 69 of the calculating section 32, while the balance displaying meter 33 displays the balance amount visually with intermittent rotation of the number ring 51 through the meter solenoid 56 and the meter lever 53.

This display may be carried out by checking the display 49 of the number ring 51 and the data in the memory 69. Namely, if a number in a certain figure is "two" in the balance data inputted in the memory 69, the meter solenoid 56 in the calculating section 32 is rotated once in the number ring 51, thereby to rotate the number ring by one pitch. Then. the rotation-detecting signal in the detecting means 58 is reversed, thereby to make the data in the memory 69 to be "one". Thereafter, the same procedure is repeated once more to make the data in the memory 69 to be "two", thereby to judge that the data in the input data is coincident with the stored data. At this point, the operation is complete.

Then, the consumed amount setting section 31 in the costing mechanism 30 is slid forward by the user for its engagement with the printing mechanism 15 of the printing drum 10. The setting dial 38 is then operated to rotate the number ring 16 through the gear transmission, thereby to set the consumed amount. Thereafter, the consumed amount setting section 31 is retreated for disengaging the printing mechanism 15.

Next, the paper S is inserted into the opening 2, which is detected by the paper-sensor 3 while the detecting mechanism 57 in the calculating section 32 reads out the consumed amount from the balance-displaying meter 33. Only when the read-out amount does not exceed the balance amount in the memory 69, the motor 21 and the clutch 22 are operated for rotating the printing drum 10.

The printing drum 10 is rotated and the ink is applied onto the printing mechanism 15 by the ink-applying mechanism 13 for printing the paper S which is then removed from the opening 2. Thus, the printing operation by the drum 10 is detected by the drum-rotation sensor 9. The rotation signal from the sensor 9 enables the calculating section 32 to subtract the consumed amount from the balance data in the memory, and the balance-displaying meter 33 to display the amount after the subtraction. The display of the balance amount on the meter 33 enables the number ring 51 to rotate intermittently through the meter solenoid 56 and the meter lever 53, and the number display 49 to be held at the predetermined position for visualizing the data externally.

Even when the power source is shutdown by the accident, the auxiliary power source 72 may supply the current to the memory for retaining the data therein, so that the user may continue its use. Further, even if the auxiliary power 72 is depleted before the main power 68 starts working to disappear the balance data from the memory 69, the RAM in the memory 69 may be checked upon the reworking of the main power source 68 to inspect the constant memory pattern or the checking data for the balance data, thereby to detect the disappeared data.

For example, when the number display 49 of the number ring 51 represents "two", the number ring 51 is then rotated once intermittently to represent "two" again. Thus, the intermittent rotation of eight times enables the position-detecting means 59 to generate the signal, so that the subsequent counting of the rotation number may confirm the display to be "two". The read-out data is reformed on the memory section 69 to restore the lost data which may be conducted for each figure, so that the balance amount may be restored completely.

The restoration of the balance data in the memory section 69 is possible during the shutdown of the power so that the balance data cannot be lost even in the absence of the auxiliary power source 72. The auxiliary power source 72, however, is advantageous for reducing the frequent restoring operation of the balance data.

Thus, the cost counter according to the invention comprises the printing drum 10, the driving mechanism 20 and the costing mechanism 30 in which the costing mechanism 30 includes the consumed amount setting section 31 for setting the consumed amount and outputting the latter as an electric signal, the calculating section 32 for sequentially subtracting the consumed amount from the balance which has been electrically preset in the balance-receiving section 71, and the balance-displaying meter section 33, while the calculating section 32 controls the balance-displaying meter section 33 for providing a display corresponding to the balance data when the latter is stored in the memory section 69 on the one hand, and the calculating section 32 detects a position of the number ring 51 at its each rotation by means of the detecting mechanism 57 for reading the balance data before lost when the latter has been lost from the memory section 69 on the other hand, thereby to enable the balance data to be restored in the memory section 69, so that the lost balance data being treated may be rapidly recovered.

Thus, even upon the shutdown of the power, the balance data displayed on the balance-displaying meter 33 may be recovered in the memory section 69 by the operation of the detecting mechanism 57 for reading the data. The electronic calculating work may be continued by the restoration of the data in the memory section 69, so that the cost counter is particularly suitable for official instruments for counting postage, revenue-tax and the like and is very reliable in maintenance of data.

With the cost counter according to the invention, the data calculated in the electrical memory may be transmitted to and maintained in the external instruments. Further, the combination of the mechanical display with the electrical memory enables the data to be read out from the mechanical display for its recovery even if the data is lost accidentally from the memory.

What is claimed is:

1. In a cost counter comprising a printing drum which at each transaction prints a consumed amount of money, and a costing mechanism wherein there is set an amount to be consumed at each transaction, said costing mechanism subtracting said amount to be consumed from a preset balance with a display of a resulting balance after each subtraction, the improvement comprising said costing mechanism being equipped with a calculating section including an electronic memory, means for introducing a balance amount into said electronic memory, an electromechanical displaying section operable to display said balance amount, a consumed amount section capable of being set to a specific amount, said consumed amount section being further capable of delivering an electric signal indicative of a transaction of a magnitude of said specific amount, said calculating section further being capable of sequentially subtracting at each transaction a consumed amount from said balance amount, said calculating section being still further capable of communicating the balance amount after each transaction to said displaying section; and balance display information detecting means for detecting an information being displayed, said detecting means including communication means to return information from said display to said calculating section upon loss of said information from said electronic memory, said balance display information detecting means further comprising at least one number ring, rotation-detecting means for detecting an intermittent rotation of the number ring, and position-detecting means for detecting an absolute reference position of the number ring, said rotation-detecting means of the detecting means including a transmission type rotation-detecting sensor and rotation-detecting apertures formed in the number ring and being of a half number of a displayed number of light apertures, and detecting a single ON-OFF cycle by means of said transmission type sensor which detects the intermittent rotation per pitch of the number ring, while the position-detecting means of the detecting means is provided with at least one position-detecting aperture formed in the number ring and a transmission type position-detecting sensor which detects an ON-OFF position for detecting a single rotation of the number ring, and an auxiliary power source operable to supply an alternate power in the event of a regular power failure.

* * * * *